United States Patent
Kakizawa et al.

(10) Patent No.: US 12,221,047 B2
(45) Date of Patent: Feb. 11, 2025

(54) PANEL MEMBER IN FRONT OF VEHICLE SEAT

(71) Applicant: SUBARU CORPORATION, Tokyo (JP)

(72) Inventors: Ryoichi Kakizawa, Tokyo (JP); Yuta Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/514,468

(22) Filed: Nov. 20, 2023

(65) Prior Publication Data

US 2024/0190374 A1    Jun. 13, 2024

(30) Foreign Application Priority Data

Dec. 13, 2022  (JP) .................................. 2022-198647

(51) Int. Cl.
*B60R 21/045* (2006.01)
*B60R 7/06* (2006.01)
*B60R 21/206* (2011.01)

(52) U.S. Cl.
CPC ............. *B60R 21/045* (2013.01); *B60R 7/06* (2013.01); *B60R 21/206* (2013.01)

(58) Field of Classification Search
CPC .................................................. B60R 21/045
See application file for complete search history.

(56) References Cited

U.S. PATENT DOCUMENTS

| | | | | |
|---|---|---|---|---|
| 4,782,913 A | * | 11/1988 | Hoffmann | B60R 13/0838 181/291 |
| 6,378,934 B1 | * | 4/2002 | Palazzolo | B62D 25/145 296/70 |
| 6,786,524 B2 | * | 9/2004 | Tamura | B60R 7/06 296/70 |
| 7,201,434 B1 | * | 4/2007 | Michalak | B60K 37/00 296/187.05 |
| 7,422,261 B2 | * | 9/2008 | Zellner, Jr. | E05B 83/30 224/483 |

(Continued)

FOREIGN PATENT DOCUMENTS

| | | | | |
|---|---|---|---|---|
| DE | 29616485 U1 | * | 11/1996 | ........... B60R 21/045 |
| DE | 102016106866 A1 | * | 10/2016 | ............. B60R 13/02 |

(Continued)

*Primary Examiner* — Nicole T Verley
(74) *Attorney, Agent, or Firm* — MCGINN I.P. LAW GROUP, PLLC

(57) ABSTRACT

A panel member is provided in front of a seat in a vehicle cabin of a vehicle at a height such that knees of an occupant who moves forward from the seat come into contact with the panel member. The panel member includes a cover member and a reinforcement member. The cover member defines a surface of the panel member. The reinforcement member is provided behind the cover member. The reinforcement member includes an upper part in an up-down direction of the vehicle and a lower part other than the upper part. The upper part is provided with a grid-shaped rib unit extending over an overall width of the reinforcement member in a vehicle width direction of the vehicle. The lower part is provided with a grid-shaped rib unit in a region excluding a central part of the reinforcement member in the vehicle width direction.

20 Claims, 7 Drawing Sheets

(56) References Cited

U.S. PATENT DOCUMENTS

| | | | | |
|---|---|---|---|---|
| 7,513,528 B2* | 4/2009 | Penner | ............... | B60R 21/055 296/187.05 |
| 7,735,865 B2* | 6/2010 | Cappabianca | ........ | B60R 21/045 180/90 |
| 8,118,348 B2* | 2/2012 | Taracko | ............... | B60R 21/045 296/187.05 |
| 8,596,681 B1* | 12/2013 | Strunk | ............... | B60R 21/045 296/187.05 |
| 8,668,238 B2* | 3/2014 | Kuwano | ............... | B60R 7/06 296/187.05 |
| 9,302,414 B2* | 4/2016 | Aselage | ............... | B60R 21/217 |
| 2002/0038965 A1* | 4/2002 | Palazzolo | ......... | B60H 1/00564 296/208 |
| 2004/0124623 A1* | 7/2004 | Yamazaki | ............ | B60R 21/045 280/752 |
| 2007/0182145 A1* | 8/2007 | Penner | ............... | B60R 7/06 280/752 |
| 2011/0084512 A1* | 4/2011 | Taracko | ............... | B60R 7/06 29/428 |
| 2012/0126563 A1* | 5/2012 | Kuwano | ............... | B60R 7/06 296/37.12 |
| 2016/0075298 A1* | 3/2016 | Ozawa | ............... | B60R 7/06 280/752 |

FOREIGN PATENT DOCUMENTS

| | | | | | |
|---|---|---|---|---|---|
| EP | 1325841 | A1 | * | 7/2003 | ........... B60R 21/045 |
| EP | 1361119 | A1 | * | 11/2003 | ........... B60R 21/045 |
| FR | 2871123 | A1 | * | 12/2005 | ........... B60R 21/045 |
| FR | 2884202 | A1 | * | 10/2006 | ........... B60K 37/00 |
| JP | H07-032945 | A | | 2/1995 | |
| JP | 2001301531 | A | * | 10/2001 | |
| JP | 2012111295 | A | * | 6/2012 | ............. B60R 7/06 |
| JP | 2013107414 | A | * | 6/2013 | |
| JP | 2016055851 | A | * | 4/2016 | |
| JP | 2018-047857 | A | | 3/2018 | |
| JP | 2020125068 | A | * | 8/2020 | |
| WO | WO-2005123466 | A1 | * | 12/2005 | ........... B60R 21/045 |
| WO | WO-2007128908 | A1 | * | 11/2007 | ............. B60R 13/02 |

\* cited by examiner

PANEL MEMBER IN FRONT OF VEHICLE SEAT

CROSS-REFERENCE TO RELATED APPLICATIONS

The present application claims priority from Japanese Patent Application No. 2022-198647 filed on Dec. 13, 2022, the entire contents of which are hereby incorporated by reference.

BACKGROUND

The disclosure relates to a panel member in front of a vehicle seat.

A vehicle, such as an automobile, includes a vehicle cabin including a driver's seat for a driver and a passenger seat provided next to the driver's seat for another occupant. The driver's seat and the passenger seat are seats.

The automobile includes a glove box in a dashboard in front of the passenger seat.

When a front collision of the vehicle occurs, an airbag deploys from the dashboard in front of the occupant seated in the passenger seat. The occupant in the passenger seat basically wears a seatbelt.

Therefore, during the front collision, the occupant in the passenger seat is held in place, and the upper part of the occupant's body can fall forward into the deployed airbag.

The airbag reduces the impact to protect the occupant in the passenger seat.

SUMMARY

An aspect of the disclosure provides a panel member provided in front of a seat in a vehicle cabin of a vehicle at a height such that knees of an occupant who moves forward from the seat are to come into contact with the panel member. The panel member includes a cover member and a reinforcement member. The cover member defines a surface of the panel member. The reinforcement member is provided behind the cover member. The reinforcement member includes an upper part in an up-down direction of the vehicle and a lower part other than the upper part. The upper part is provided with a first grid-shaped rib unit extending over an overall width of the reinforcement member in a vehicle width direction of the vehicle. The lower part is provided with a second grid-shaped rib unit in a region excluding a central part of the reinforcement member in the vehicle width direction of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

When a front collision of a vehicle occurs, an occupant in a passenger seat is basically held in place in the passenger seat, but may move forward along the passenger seat depending on the intensity of the front collision.

Accordingly, Japanese Unexamined Patent Application Publications No. H07-032945 and No. 2018-047857 propose a glove box in a dashboard that receives the knees of the occupant who moves forward from the passenger seat.

When the right and left knees come into contact with the glove box on the dashboard, the occupant's hip bone can be restrained from moving forward, so that the occupant can remain seated in the passenger seat. The occupant in the passenger seat does not easily fall forward out of the passenger seat as in the submarine effect. The occupant's hip bone restrained from moving forward is raised due to inertia while the occupant remains seated in the passenger seat, and the upper part of the occupant's body rotates around the hip bone and falls forward in a straight position. The upper part of the occupant's body can fall into the deployed airbag in an appropriate manner.

However, studies conducted by the inventors of the disclosure revealed that even when the occupant's right and left knees come into contact with the glove box on the dashboard, it may be difficult to stop the forward movement if the occupant in the passenger seat is an adult female, for example. When an adult female in the passenger seat moves forward, for example, her right and left knees may move downward beneath the glove box on the dashboard after coming into contact with the glove box. The downward movement of the knees causes the waist of the occupant to tilt forward.

Accordingly, the hip bone of the adult female whose knees have moved downward may move upward off the passenger seat or be raised excessively such that the hip bone can tilt forward. The upper part of the body may rotate around the hip bone and fall forward in such a state. In this case, for example, the hip bone may be raised to tilt forward significantly, or the upper part of the body may be bent backward due to its portion above the hip bone moving later than the hip bone. The upper part of the body may fall into the deployed airbag in such a state.

Basically, the above-described situation may be due to the adult female having a smaller body with shorter legs and being lighter in weight than an adult male.

It is desirable that the vehicle be capable of restraining both an adult male and an adult female who is smaller than the adult male from moving forward from a seat, such as a passenger seat.

An embodiment of the disclosure will now be described with reference to the drawings.

Figure 1:
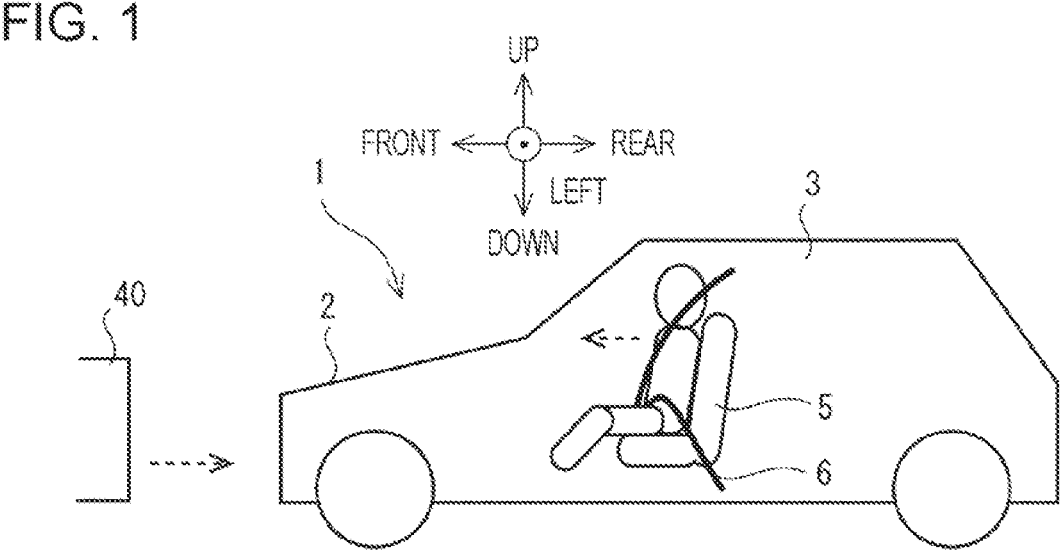
FIG. 1 is a schematic side view of an automobile as a vehicle according to an embodiment of the disclosure.

FIG. 1 is a schematic side view of an automobile 1 according to an embodiment of the disclosure.

Figure 2:
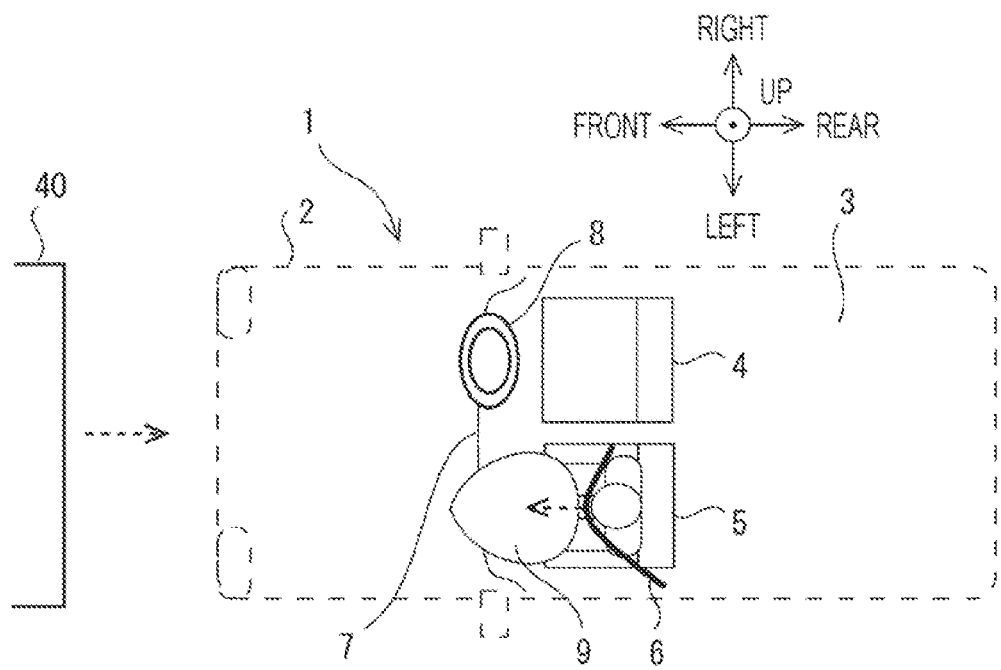
FIG. 2 is a schematic top view of the automobile illustrated in FIG. 1.

FIG. 2 is a schematic top view of the automobile 1 illustrated in FIG. 1.

The automobile 1 is an example of a vehicle including a vehicle body 2 having a vehicle cabin 3 provided with seats including a driver's seat 4 and a passenger seat 5. An occupant can enter the vehicle cabin 3 and sit on the seats. In FIG. 1, the passenger seat 5 is provided on the left side of the driver's seat 4. A steering wheel 8 extending rearward from a dashboard 7 is provided in front of the driver's seat 4. Other examples of vehicles include a bus, a truck, and a train.

Referring to FIG. 1, assume that the automobile 1 experiences a front collision with another automobile 40.

When such a front collision occurs, the automobile 1 detects the collision and causes the seatbelt 6 to hold the occupant in place. The automobile 1 also deploys an airbag. In FIG. 2, a large passenger front airbag 9 is deployed rearward from the dashboard 7. The large passenger front airbag 9 is deployed in front of the passenger seat 5. Thus, the occupant in the passenger seat 5 is held in place in the passenger seat 5. When the upper part of the body of the occupant in the passenger seat 5 falls forward, the upper part of the body falls into the large passenger front airbag 9 in the deployed state, and is supported by the large passenger front airbag 9. The impact applied to the occupant during the front collision is reduced. The occupant in the passenger seat 5 can be protected during the front collision.

FIG. 1 and other figures illustrate up, down, left, right, front, and rear directions based on the front-rear direction of the vehicle body 2 of the automobile 1 as a reference. In the following description, the up, down, left, right, front, and rear directions will be referred to with reference to FIG. 1. A vehicle width direction may be the left-right direction. In this case, a central part A2 in the vehicle width direction of the vehicle body 2 is an inner region in the vehicle width direction. Outer regions in the vehicle width direction are regions near the sides of the vehicle body 2.

The manner in which an occupant in the above-described passenger seat 5 moves in a front collision will now be described in detail.

The occupant in the passenger seat 5 may be a large adult male, or may be an adult female smaller than the adult male.

Figure 3:
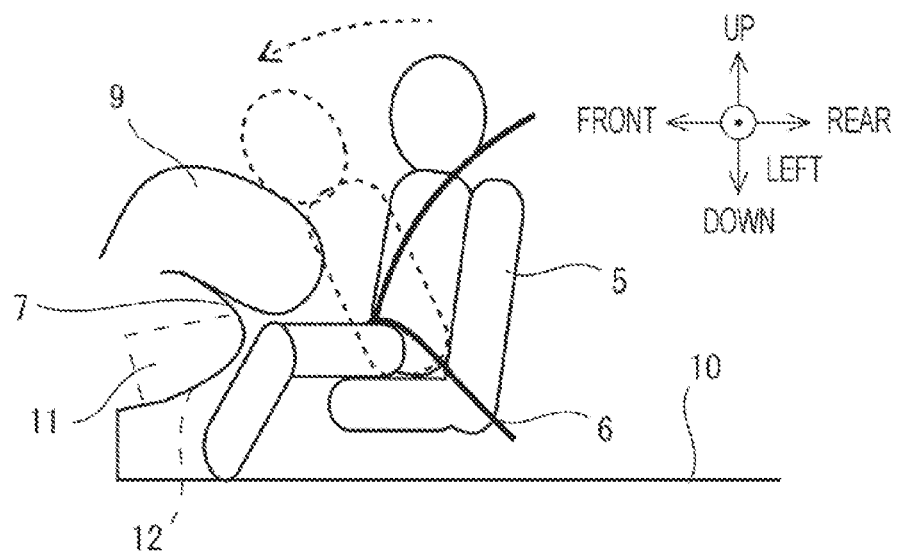
FIG. 3 illustrates an example of the manner in which an occupant in a passenger seat of the automobile illustrated in FIG. 1 moves in a front collision when the occupant is an adult male.

FIG. 3 illustrates an example of the manner in which the occupant in the passenger seat 5 of the automobile 1 illustrated in FIG. 1 moves in a front collision when the occupant is an adult male.

Figure 4:
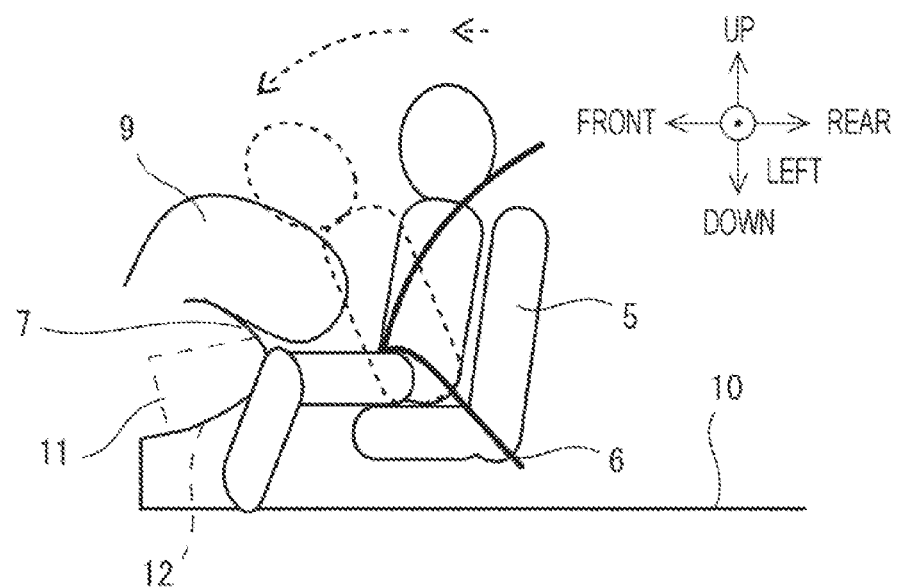
FIG. 4 illustrates an example of the manner in which the adult male illustrated in FIG. 3 moves in a front collision when he moves forward in the front collision.

FIG. 4 illustrates an example of the manner in which the adult male illustrated in FIG. 3 moves in a front collision when he moves forward in the front collision.

When a front collision occurs while the adult male is seated in the passenger seat 5, basically, as illustrated in FIG. 3, the adult male can be held in place by the seatbelt 6 at the position at which he is seated in the passenger seat 5. Then, as illustrated by the dashed lines in FIG. 3, the upper part of the adult male's body held in place falls into the passenger front airbag 9 deployed in front thereof.

However, the adult male may move forward along the passenger seat 5, as illustrated in FIG. 4, depending on the intensity of the front collision. Referring to FIG. 4, a glove box 11 is provided in the dashboard 7 in front of the passenger seat 5. The right and left knees of the occupant who moves forward come into contact with a lid 12 of the glove box 11. The lid 12 can be opened and closed. The lid 12 is a panel member in front of the passenger seat.

The lid 12 of the glove box 11 supports the right and left knees of the adult male so that the adult male does not move further forward. The adult male can remain seated in the passenger seat 5. Therefore, even when the adult male moves forward along the passenger seat 5, he can remain seated in the passenger seat 5. The adult male seated in the passenger seat 5 can be held in place by the seatbelt 6. The upper part of the adult male's body can fall into the passenger front airbag 9 deployed in front thereof while the adult male is held in place.

The right and left knees of the adult male come into contact with the lid 12 of the glove box 11 in the dashboard 7 so that the hip bone of the adult male is restrained from moving forward. The adult male can remain seated in the passenger seat 5. The adult male seated in the passenger seat 5 does not easily fall forward out of the passenger seat 5.

The hip bone of the adult male retained from moving forward is raised due to its inertia before the front collision while the adult male remains seated in the passenger seat 5. The upper part of the adult male's body can rotate around the hip bone and fall forward in a straight position.

Thus, even when the adult male moves forward as illustrated in FIG. 4, the upper part of the adult male's body can fall into the large passenger front airbag 9 in an appropriate manner, similarly to the case illustrated in FIG. 3.

Basically, an adult female in the passenger seat 5 is generally expected to move similarly to the adult male in the passenger seat 5.

Figure 5:
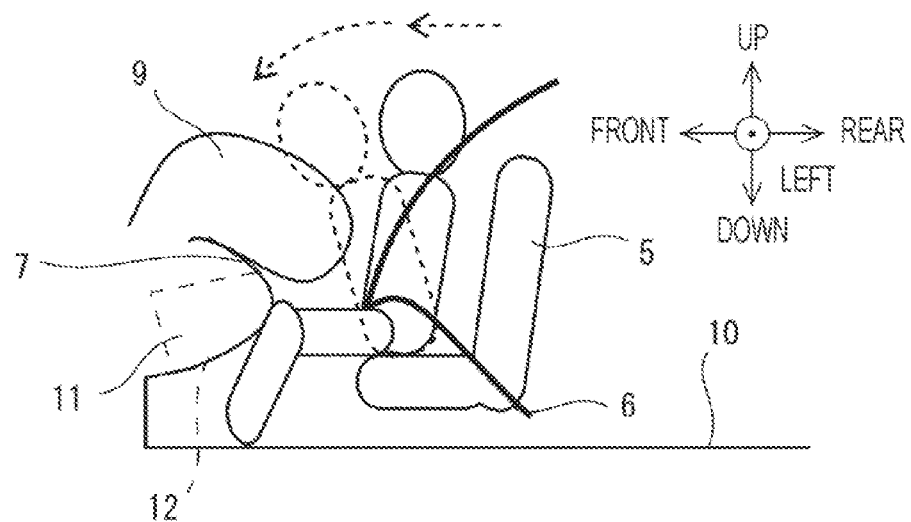
FIG. 5 illustrates an example of the manner in which an adult female in the passenger seat illustrated in FIG. 3 is expected to move in a front collision.

FIG. 5 illustrates an example of the manner in which an adult female in the passenger seat 5 illustrated in FIG. 3 is expected to move in a front collision.

When a front collision occurs while the adult female is seated in the passenger seat 5, the adult female may move forward, as illustrated in FIG. 5. Also in this case, similarly to the adult male illustrated in FIG. 4, the right and left knees of the adult female come into contact with the lid 12 of the glove box 11. Accordingly, the adult female in the passenger seat 5 is expected to be supported similarly to the adult male in the passenger seat 5 and prevented from moving further forward from the position at which the adult female is seated in the passenger seat 5.

However, contrary to the expectation, there is a possibility that the adult female will move further forward even after the right and left knees come into contact with the lid 12 of the glove box 11. The inventors of the disclosure have conducted intensive studies on the possibility of occurrence of such a situation.

Figure 6:
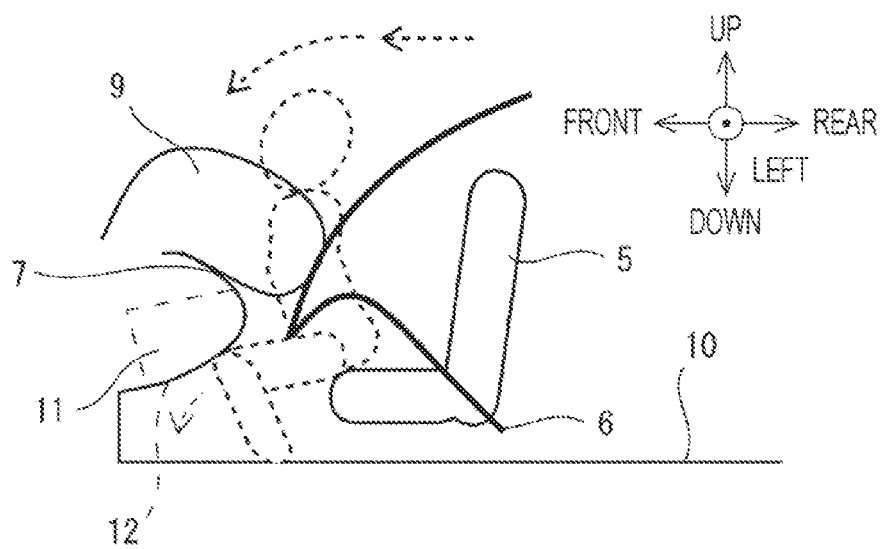
FIG. 6 illustrates another example of the manner in which an adult female in the passenger seat illustrated in FIG. 3 moves in a front collision.

FIG. 6 illustrates another example of the manner in which the adult female in the passenger seat 5 illustrated in FIG. 3 moves in a front collision.

Referring to FIG. 6, after coming into contact with the lid 12 of the glove box 11 in the dashboard 7, the right and left knees of the adult female in the passenger seat 5 are pushed downward by the lid 12 and move forward beneath the lid 12. When the knees are pushed downward by the lid 12 of the glove box 11 in this manner, the waist of the adult female is tilted forward.

Therefore, the hip bone of the adult female whose knees have been pushed downward after coming into contact with the lid 12 of the glove box 11 may be raised excessively so as to tilt forward, as illustrated in FIG. 6, or move upward off the passenger seat 5. The upper part of the adult female's body rotate about the hip bone in such a state and falls forward. In this case, a portion of the upper part of the adult female's body that is above the hip bone moves forward later than the hip bone. As a result, the upper part of the adult female's body falls into the large passenger front airbag 9 in the deployed state while being bent backward toward the rear. Thus, the upper part of the body falls in a manner different from those in FIGS. 3 and 5. This may cause an unexpected situation.

Basically, the situation illustrated in FIG. 6 may be due to the adult female being smaller with their knees at a lower height from a floor surface 10 of the vehicle cabin 3 than the adult male, and being lighter in weight than the adult male.

The lid 12 of the glove box 11 typically has a curved shape that matches a curved shape of the dashboard 7 on which the lid 12 is provided. The lid 12 having a curved shape includes a lower part A5 that basically extends forward and downward.

Due to these combined factors, unlike the adult male, the adult female in the passenger seat 5 may move in the manner illustrated in FIG. 6 in a front collision.

Accordingly, it is desirable that the automobile 1 be capable of restraining the adult female smaller than the adult male from moving forward from a seat, such as the passenger seat 5.

Also, it is desirable that the automobile 1 be capable of restraining the adult female smaller than the adult male from moving forward from a seat, such as the passenger seat 5, similarly to the adult male.

Figure 7:
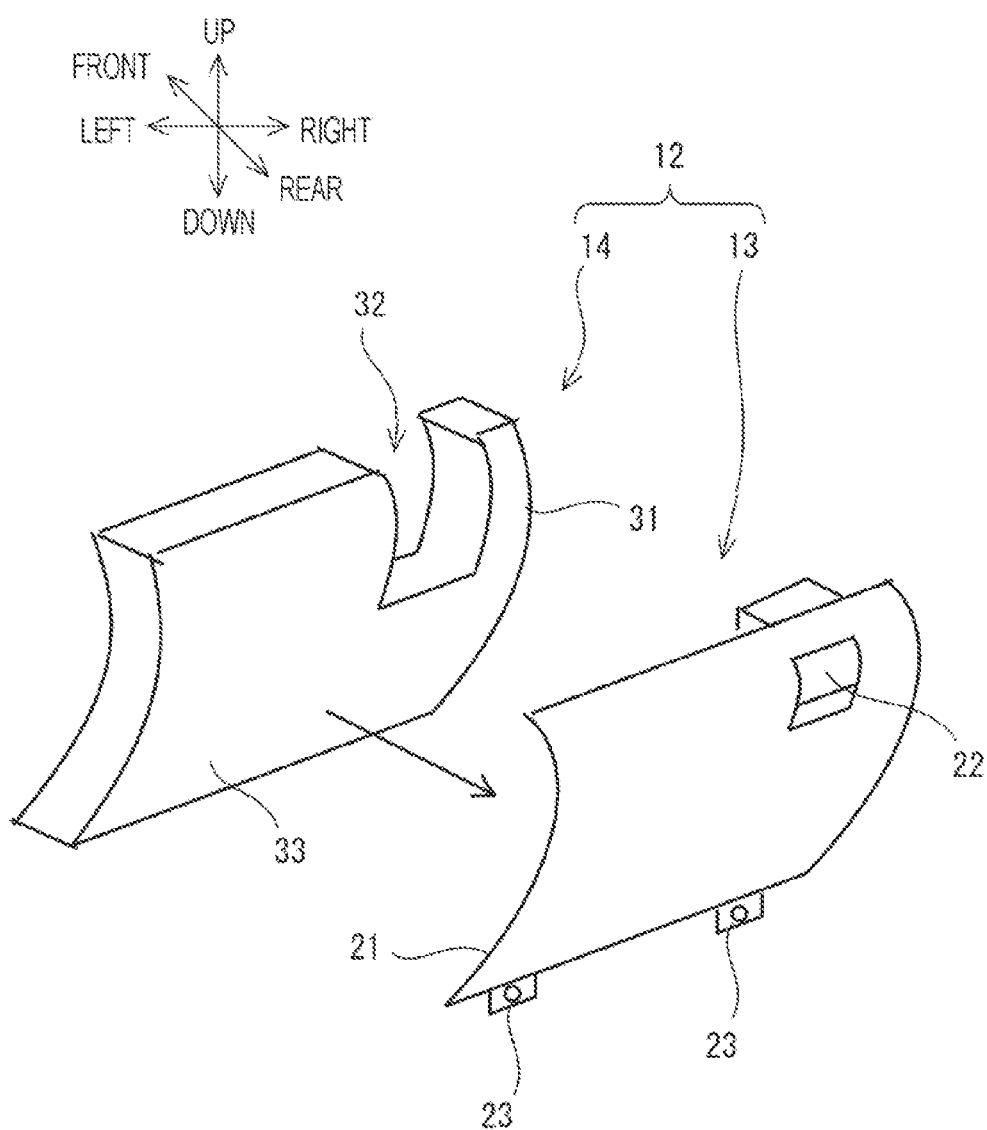
FIG. 7 is an exploded view of a lid of a glove box included in the automobile illustrated in FIG. 1.

FIG. 7 is an exploded view of the lid 12 of the glove box 11 included in the automobile 1 illustrated in FIG. 1.

The lid 12 of the glove box 11 illustrated in FIG. 7 includes a curved-plate-shaped cover member 13 that constitutes a surface design of the lid 12 and a reinforcement member 14 provided on a back surface of the cover member 13.

The curved-plate-shaped cover member 13 includes a cover body 21, an operation unit 22, and attachment tabs 23.

The cover body 21 may basically be a rectangular resin plate that is elongated in the vehicle width direction and curved forward in the up-down direction. The cover body 21 may have a curved shape that matches the curved shape of the dashboard 7. The plate-shaped cover body 21 that is elongated in the vehicle width direction and curved in the up-down direction may be provided to extend from the rear end of the curved dashboard 7 along a lower surface of the curved dashboard 7. The large passenger front airbag 9 deploys above an upper surface of the curved dashboard 7.

The attachment tabs 23 project from the lower end of the plate-shaped cover body 21 that is elongated in the vehicle width direction and curved in the up-down direction. The curved-plate-shaped cover member 13 may be fixed to the dashboard 7 at the attachment tabs 23. The cover body 21 is rotatable about the attachment tabs 23 fixed to the dashboard 7.

The operation unit 22 may be provided on an upper part A4 of the plate-shaped cover body 21 that is elongated in the vehicle width direction and curved in the up-down direction. The operation unit 22 may include, for example, a handle operated by an occupant to open and close the glove box 11. The operation unit 22 may also include a mechanism for detecting a touch on the operation unit 22. When the operation unit 22 is operated, the cover body 21 may be disengaged from the dashboard 7. When the cover body 21 is disengaged from the dashboard 7, the lid 12 can be opened and closed. A mechanism for engagement between the cover body 21 and the dashboard 7 may be provided on the operation unit 22. In general, for example, the operation unit 22 may include a mechanism for disengaging the cover body 21 from the dashboard 7 when a handle is moved upward. As illustrated in FIG. 7, the operation unit 22 having such a mechanism may be provided on the upper part A4 of the curved-plate-shaped cover member 13 so as to project from the back surface of the cover member 13.

The lid 12 of the glove box 11 may be operated by both the occupant in the passenger seat 5 and the driver in the driver's seat 4. Therefore, as illustrated in FIG. 7, the operation unit 22 may be provided on the upper part A4 of the cover body 21 at a position shifted inward from the center in the vehicle width direction.

Figure 8:
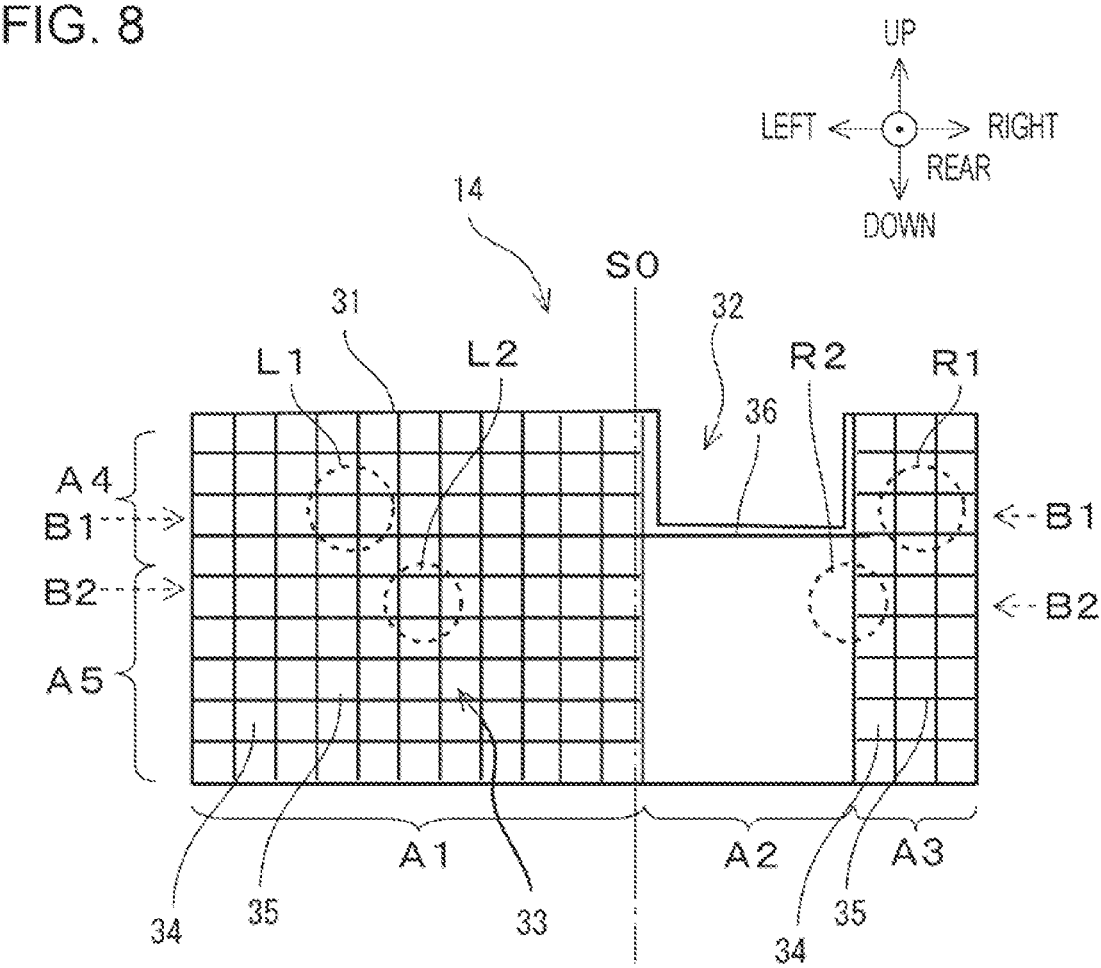
FIG. 8 is a schematic diagram illustrating a rib structure of a reinforcement member illustrated in FIG. 7.

FIG. 8 is a schematic diagram illustrating a rib structure of the reinforcement member 14 illustrated in the FIG. 7.

The reinforcement member 14 includes a reinforcement body 31 curved along the plate-shaped cover body 21 that is elongated in the vehicle width direction and curved in the up-down direction. The reinforcement body 31 may be made of, for example, a rubber material or a flexible resin material. The reinforcement member 14 may be thicker than the cover body 21 so that the reinforcement member 14 has a high rigidity. FIG. 8 illustrates the curved reinforcement member 14 developed along a plane so as to extend straight in the up-down direction.

The reinforcement body 31 may have substantially cubic holes 34 arranged in a matrix pattern in a surface 33 facing the cover body 21. In such a case, the reinforcement body 31 includes a grid-shaped rib unit 35. The grid-shaped rib unit 35 includes members extending in the vehicle width direction and members extending in the up-down direction.

The substantially cubic holes 34 may or may not extend through the reinforcement body 31. When the substantially cubic holes 34 do not extend through the reinforcement body 31, the reinforcement body 31 includes a plate through which the substantially cubic holes 34 do not extend. In this case, the reinforcement member 14 has a three-dimensional shape including the plate and the grid-shaped rib unit 35 provided on one surface of the plate. The plate of the reinforcement member 14 may define an inner surface of the glove box 11.

In the present embodiment, the grid-shaped rib unit 35 does not extend over the entirety of the surface 33 of the reinforcement body 31 facing the cover body 21.

As illustrated in FIG. 8, the surface 33 of the reinforcement body 31 facing the cover body 21 may be sectioned into the upper part A4 in the up-down direction of the automobile 1 and the lower part A5 other than the upper part A4. The reinforcement body 31 can be sectioned into an outer part A1, the central part A2, and an inner part A3 in the vehicle width direction of the automobile 1.

The upper part A4 of the reinforcement body 31 may be provided at the height of regions R1 and L1 indicated by two dashed circles in FIG. 8. The regions R1 and L1 are respectively contacted by the right and left knees of an adult male who moves forward from the passenger seat 5. The knees of the adult male come into contact with the upper part A4 of the reinforcement body 31 at the height indicated by B1 in FIG. 8. An adult male dummy may have knees at a height set by using as a reference the height of the regions R1 and L1 respectively contacted by the right and left knees of the adult male.

The lower part A5 of the reinforcement body 31 may be provided at the height of regions R2 and L2 indicated by another two dashed circles in FIG. 8. The regions R2 and L2 are respectively contacted by the right and left knees of an adult female who moves forward from the passenger seat 5. An adult female dummy may have knees at a height set by using as a reference the height of the regions R2 and L2 respectively contacted by the right and left knees of the adult female.

The grid-shaped rib unit 35 extends over the overall width of the reinforcement member 14 in the vehicle width direction in the upper part A4 of the reinforcement body 31.

The upper part A4 of the reinforcement body 31 has a cutout 32 at a position corresponding to the operation unit 22 of the cover member 13. Accordingly, the reinforcement body 31 can be placed on the cover member 13 without interfering with the operation unit 22 of the cover member 13. The cutout 32 corresponding to the operation unit 22 of the cover member 13 is formed within the upper part A4 of the reinforcement member 14. The upper part A4 of the reinforcement member 14 is provided with a straight rib unit 36 permanently affixed to the grid-shaped rib unit 35 below the cutout 32.

The rigidity of the upper part A4 of the reinforcement body 31 may be reduced due to the cutout 32. However, when the reinforcement member 14 is attached to the cover member 13, the operation unit 22 of the cover member 13 is placed in the cutout 32 in the reinforcement body 31. In addition, the straight rib unit 36 permanently affixed to the grid-shaped rib unit 35 is disposed below the cutout 32. Therefore, the upper part A4 of the lid 12 is rigid and not easily deformed even though the upper part A4 of the reinforcement member 14 has the cutout 32.

The lower part A5 of the reinforcement body 31 can be sectioned into the outer part A1 in an outer region in the vehicle width direction, the inner part A3 in an inner region in the vehicle width direction, and the central part A2 between the outer part A1 and the inner part A3. Referring to FIG. 8, the central part A2 is disposed below the cutout 32 in the lower part A5 of the reinforcement body 31. In the lower part A5 of the reinforcement member 14, the central part A2 overlaps the region (R2) contacted by the right knee of the adult female dummy that moves forward from the passenger seat 5. The right knee is one of the right and left knees that is closer to the center of the automobile 1 in the vehicle width direction of the automobile 1.

The lower part A5 of the reinforcement body 31 is provided with the grid-shaped rib unit 35 that is permanently affixed to the grid-shaped rib unit 35 in the upper part A4 of the reinforcement body 31 and that extends in regions excluding the central part A2 of the reinforcement member 14 in the vehicle width direction of the automobile 1, that is, in the outer part A1 and the inner part A3.

The central part A2 having no rib units may be thin-plate-shaped.

The reinforcement member 14 having the above-described shape is attached to the back surface of the cover member 13 at an end of the grid-shaped rib unit 35.

In the present embodiment, the straight rib unit 36 disposed below the cutout 32 and permanently affixed to the grid-shaped rib unit 35 in the upper part A4 of the reinforcement member 14 is not attached to the back surface of the cover member 13. Accordingly, the central part A2 of the reinforcement member 14 including the straight rib unit 36 is not attached to the back surface of the cover member 13. The rib unit in the upper part A4 of the reinforcement member 14 is attached to the back surface of the cover member 13 in regions corresponding to the outer part A1 and the inner part A3 of the lower part A5.

The lower part A5 of the reinforcement member 14 is attached to the back surface of the cover member 13 in regions other than the central part A2 in which the grid-shaped rib unit 35 is not provided, that is, in the outer part A1 and the inner part A3.

Assuming that the above-described lid 12 is provided in front of the passenger seat 5, the manner in which an adult male in the passenger seat 5 moves in a front collision will be described.

Figure 9:
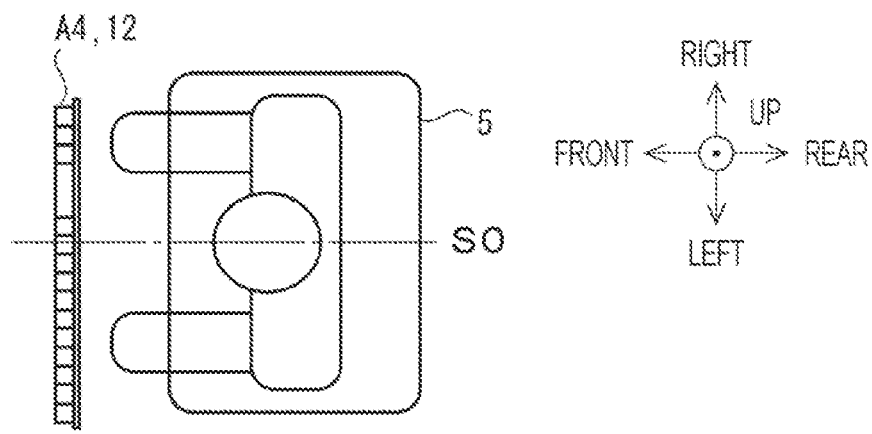
FIG. 9 illustrates an adult male in the passenger seat of the automobile illustrated in FIG. 1 including the lid illustrated in FIG. 7.

FIG. 9 illustrates an adult male in the passenger seat 5 of the automobile 1 illustrated in FIG. 1 including the lid 12 illustrated in FIG. 7.

Figure 10:
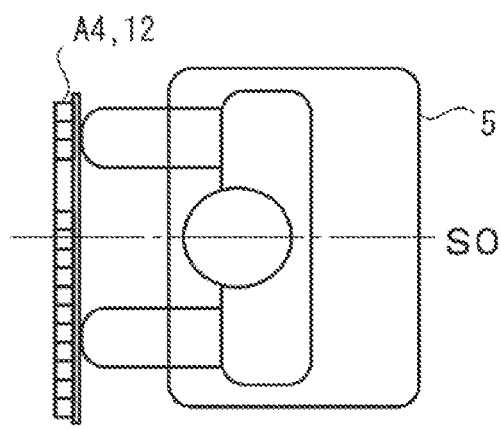
FIG. 10 illustrates the adult male illustrated in FIG. 9 who has moved forward in a front collision and whose right and left knees are in contact with the lid illustrated in FIG. 7.

FIG. 10 illustrates the adult male illustrated in FIG. 9 who has moved forward in a front collision and whose right and left knees are in contact with the lid 12 illustrated in FIG. 7.

S0 indicates the center line of the passenger seat 5 in the vehicle width direction.

As illustrated in FIG. 9, the adult male is seated in the passenger seat 5 of the automobile 1. As illustrated in FIGS. 1 and 2, the adult male may be wearing the seatbelt 6.

When a front collision of the automobile 1 occurs, the adult male in the passenger seat 5 may move forward along the passenger seat 5 even when he is held in place by the seatbelt 6. As illustrated in FIG. 10, the right and left knees of the adult male who moves in this manner come into contact with the lid 12 of the glove box on the dashboard 7.

The right and left knees of the adult male come into contact with the lid 12 at a height corresponding to the upper part A4 of the reinforcement member 14 illustrated in FIG. 8. The right and left knees of the adult male may come into contact with the lid 12 at positions substantially symmetrical to each other about the center line S0 of the passenger seat 5 in the vehicle width direction.

The upper part A4 of the reinforcement member 14 basically includes the grid-shaped rib unit 35 extending over the overall width thereof, and is therefore rigid and not easily deformed. Therefore, even when the lid 12 receives load from the right and left knees of the adult male, the lid 12 is not deformed and can support the adult male. As illustrated in FIG. 10, the right and left knees of the adult male can be reliably supported at the positions at which the right and left knees have come into contact with the lid 12. The hip bone of the adult male can also be reliably supported.

As a result, the adult male having his right and left knees supported by the lid 12 does not easily move further forward. The adult male can remain seated in the passenger seat 5 with his right and left knees supported by the lid 12. The upper part of the adult male's body can fall forward while the adult male remains seated in the passenger seat 5. The hip bone of the adult male that is restrained from moving forward is raised due to inertia while the adult male remains seated in the passenger seat 5, and the upper part of the adult male's body rotates around the hip bone and falls forward in a straight position. The upper part of the adult male's body can fall into the deployed passenger front airbag 9 in an appropriate manner.

Assuming that the above-described lid 12 is provided in front of the passenger seat 5, the manner in which an adult female in the passenger seat 5 moves in a front collision will be described.

Figure 11:
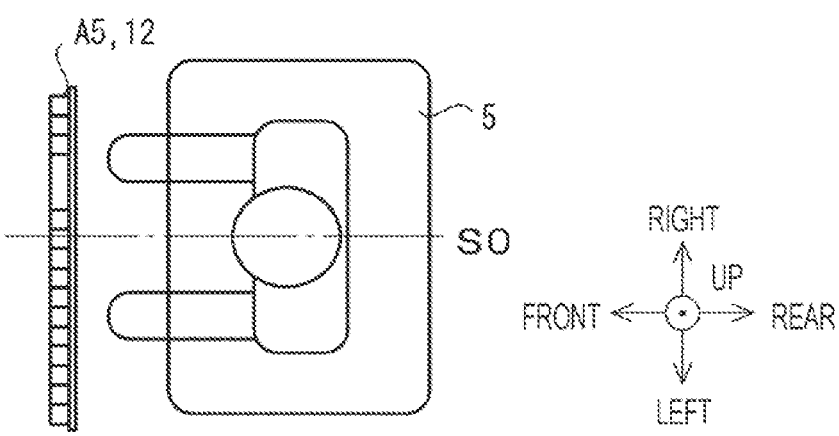
FIG. 11 illustrates an adult female in the passenger seat of the automobile illustrated in FIG. 1 including the lid illustrated in FIG. 7.

FIG. 11 illustrates the adult female in the passenger seat 5 of the automobile 1 illustrated in FIG. 1 including the lid 12 illustrated in FIG. 7.

Figure 12:
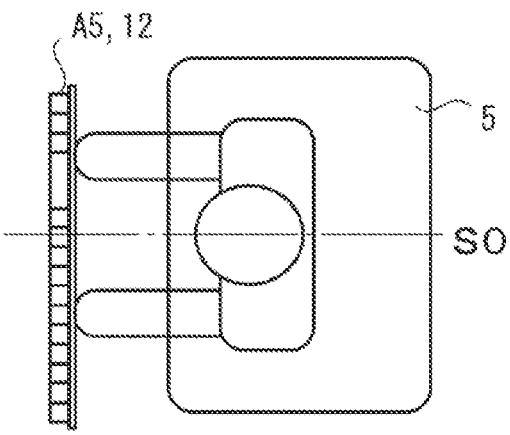
FIG. 12 illustrates the adult female illustrated in FIG. 11 who has moved forward in a front collision and whose right and left knees are in contact with the lid illustrated in FIG. 7.

FIG. 12 illustrates the adult female illustrated in FIG. 11 who has moved forward in a front collision and whose right and left knees are in contact with the lid 12 illustrated in FIG. 7.

Figure 13:
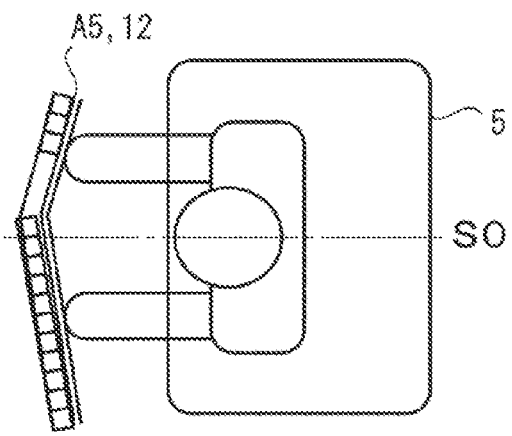
FIG. 13 illustrates the lid illustrated in FIG. 7 that is bent from the position illustrated in FIG. 12 by receiving load of the adult female.

FIG. 13 illustrates the lid 12 illustrated in FIG. 7 that is bent from the position illustrated in FIG. 12 by receiving load of the adult female.

As illustrated in FIG. 11, the adult female is seated in the passenger seat 5 of the automobile 1. As illustrated in FIGS. 1 and 2, the adult female may be wearing the seatbelt 6. When a front collision of the automobile 1 occurs, the adult female in the passenger seat 5 may move forward along the passenger seat 5 even when she is held in place by the seatbelt 6. As illustrated in FIG. 12, the right and left knees of the adult female who moves in this manner come into contact with the lid 12 of the glove box on the dashboard 7.

The right and left knees of the adult female come into contact with the lid 12 at a height corresponding to the lower part A5 of the reinforcement member 14 illustrated in FIG. 8. Unlike the upper part A4, the lower part A5 of the reinforcement member 14 includes the grid-shaped rib unit 35 in regions excluding the central part A2, that is, in the outer part A1 and the inner part A3. Therefore, when contacted by the right and left knees of the adult female as illustrated in FIG. 12, the lid 12 is deformed and bent at the central part A2 of the reinforcement member 14, as illustrated in FIG. 13.

Accordingly, the right and left knees of the adult female do not receive a large reaction force as in the case where the lid 12 is not deformed. As illustrated in FIG. 13, after coming into contact with the lid 12, the right and left knees of the adult female remain in contact with the lid 12 while the lid 12 is being bent in accordance with the load applied thereto. Therefore, the right and left knees of the adult female continuously receives an appropriate reaction force. The right and left knees of the adult female can be supported by the lid 12 while the lid 12 is being deformed from the shape illustrated in FIG. 12 to the shape illustrated in FIG. 13.

As a result, the adult female having her right and left knees supported by the lid 12 does not easily move forward by a large distance after coming into contact with the lid 12. The adult female can remain seated in the passenger seat 5 with her right and left knees being continuously supported by the lid 12. The upper part of the adult female's body falls forward while the adult female remains seated in the passenger seat 5. The hip bone of the adult female that is restrained from moving forward is raised due to inertia while the adult female remains seated in the passenger seat 5, and the upper part of the adult female's body rotates around the hip bone and falls forward in a straight position. The upper part of the adult female's body can fall into the deployed passenger front airbag 9 in an appropriate manner.

Figure 14:
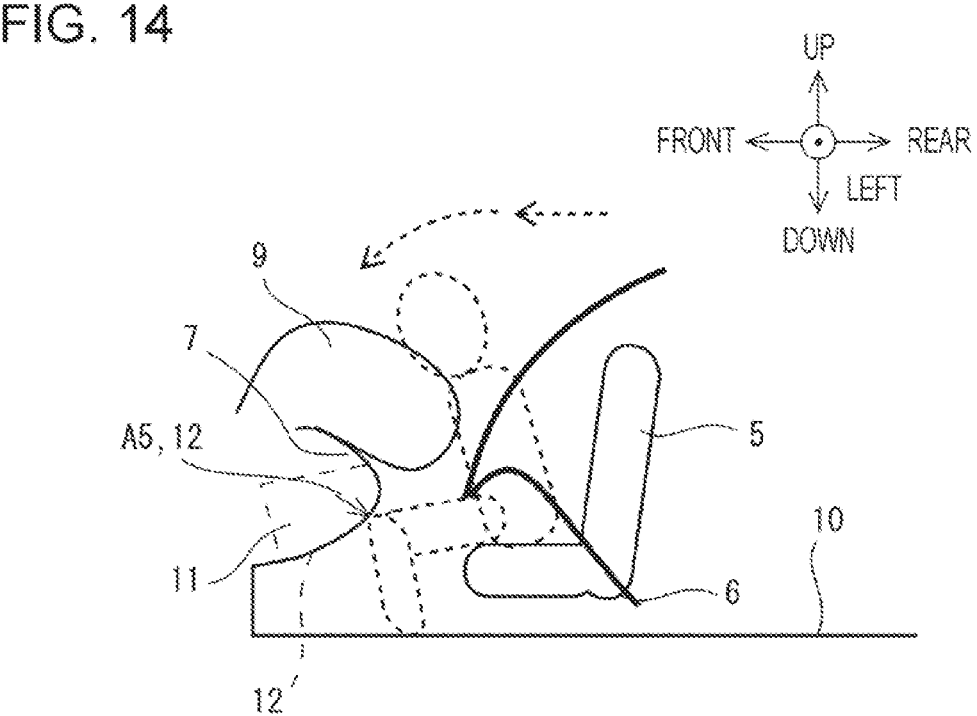
FIG. 14 illustrates an example of the manner in which an adult female in the passenger seat of the automobile illustrated in FIG. 1 moves in a front collision when the automobile includes the lid illustrated in FIG. 7.

FIG. 14 illustrates an example of the manner in which an adult female in the passenger seat 5 of the automobile 1 illustrated in FIG. 1 moves in a front collision when the automobile 1 includes the lid 12 illustrated in FIG. 7.

FIG. 14 corresponds to FIG. 6.

In FIG. 6, after the knees of the adult female come into contact with the lid 12, the knees are pushed downward by the lid 12 that is not deformed. The hip bone of the adult female may be raised excessively so as to tilt forward, or move upward off the passenger seat 5. As a result, in FIG. 6, the adult female may fall into the deployed airbag while her hip bone is significantly tilted forward or while the upper part of the body is bent backward due to its portion above the hip bone moving later than the hip bone.

In the present embodiment, as illustrated in FIG. 14, after the knees of the adult female come into contact with the lid 12, the knees can be continuously supported by the lid 12 that is deformed. The hip bone of the adult female is not easily raised excessively so as to tilt forward, nor does it easily move upward off the passenger seat 5. As a result, the adult female does not easily fall into the deployed passenger front airbag 9 while her hip bone is significantly tilted forward, as illustrated in FIG. 6 or while the upper part of the body is bent backward due to its portion above the hip bone moving later than the hip bone. The upper part of the adult female's body can rotate around the hip bone and fall into the deployed passenger front airbag 9 in an appropriate manner such that the upper part of the adult female's body is in a straight position.

As described above, according to the present embodiment, the lid 12 serves as a panel member provided in front of the passenger seat 5 in the vehicle cabin 3 of the automobile 1 at a height such that the knees of the occupant who moves forward from the passenger seat 5 come into contact with the lid 12. The lid 12 includes the cover member 13 defining the surface of the lid 12 and the reinforcement member 14 provided behind the cover member 13. The reinforcement member 14 includes the upper part A4 in the up-down direction of the automobile 1 and the lower part A5 other than the upper part A4. The upper part A4 of the reinforcement member 14 is provided with the grid-shaped rib unit 35 extending over the overall width of the reinforcement member 14 in the vehicle width direction of the automobile 1. The lower part A5 of the reinforcement member 14 is provided with the grid-shaped rib unit 35 over a region excluding the central part A2 of the reinforcement member 14 in the vehicle width direction of the automobile 1.

The knees of the adult female who moves forward from the passenger seat 5 come into contact with the lower part A5 that is below the knees of the adult male who moves forward from the passenger seat 5. The lower part A5 of the reinforcement member 14 is provided with the grid-shaped rib unit 35 extending over a region excluding the central part A2 in the vehicle width direction of the automobile 1. Therefore, the lower part A5 of the reinforcement member 14 is bent at the central part A2 due to load applied to the lid 12 in front of the passenger seat when the knees of the adult female come into contact with the lower part A5. The reinforcement member 14 can be deformed so that the knees of the adult female in contact with the lower part A5 are not easily pushed downward beneath the lid 12. The knees of the adult female can be continuously in contact with the lower part A5 of the reinforcement member 14.

In the present embodiment, the upper part A4 of the reinforcement member 14 is provided with the grid-shaped rib unit 35 extending over the overall width of the reinforcement member 14 in the vehicle width direction of the automobile 1. When the upper part A4 having such a structure is not provided, the reinforcement member 14 will be bent at the central part A2 over the entire region thereof. In the present embodiment, the reinforcement member 14 is not easily bent at the central part A2 over the entire region thereof. When the reinforcement member 14 is not bent at the central part A2 over the entire region thereof, the reinforcement member 14 can appropriately support the knees of the adult female that are in contact therewith. Accordingly, the knees of the adult female can be supported by remaining in contact with the lower part A5 of the reinforcement member 14 after coming into contact with the lower part A5 of the reinforcement member 14.

The knees of the adult male who moves forward from the passenger seat 5 come into contact with the upper part A4 of the reinforcement member 14. The upper part A4 of the reinforcement member 14 is provided with the grid-shaped rib unit 35 extending over the overall width thereof. Therefore, the upper part A4 of the reinforcement member 14 is not bent at the central part A2 after the knees of the adult male come into contact with the upper part A4, and can support the knees of the adult male.

Thus, the lid 12 provided in front of the passenger seat according to the present embodiment can support both the knees of the adult male and the knees of the adult female smaller than the adult male. In the present embodiment, similarly to the adult male, the adult female can also be restrained from moving forward from the passenger seat 5.

In the present embodiment, the central part A2 of the lower part A5 of the reinforcement member 14 in the vehicle width direction is not provided with the grid-shaped rib unit 35. The central part A2 overlaps one of the right and left knees of the adult female who moves forward from the passenger seat 5, the one of the right and left knees being closer to the center of the automobile 1 in the vehicle width direction of the automobile 1 than the other of the right and left knees.

Accordingly, load of the adult female can apply a force that directly pushes and bends the central part A2 to the reinforcement member 14. The reinforcement member 14 can start to bend immediately after being contacted by the knees of the adult female.

If the reinforcement member 14 starts to bend a certain time after being contacted by the knees of the adult female, there is a possibility that a large reaction force will be generated during that time and that the knees of the adult female will be pushed downward by the reinforcement member 14 that is not bent.

According to the present embodiment, the knees of the adult female are not easily pushed downward in this manner, and can be continuously in contact with the lid 12 in front of the passenger seat.

According to the present embodiment, the reinforcement member 14 is attached to the back surface of the cover member 13 at an end of the rib unit. However, the straight rib unit 36 included in the upper part A4 in an upper region of the central part A2 in the vehicle width direction is not attached to the back surface of the cover member 13 at an end thereof.

When the entirety of the rib unit in the upper part A4 including the straight rib unit 36 in the upper region of the central part A2 in the vehicle width direction is attached to the back surface of the cover member 13, the central part A2 is not easily bent due to the straight rib unit 36 in the upper region being attached to the back surface of the cover member 13. Therefore, the central part A2 cannot easily start to bend immediately after being contacted by the knees of the adult female. If the reinforcement member 14 starts to bend a certain time after being contacted by the knees of the adult female, there is a possibility that a large reaction force will be generated during that time and that the knees of the adult female will be pushed downward by the reinforcement member 14 that is not yet bent.

According to the present embodiment, the knees of the adult female are not easily pushed downward so that the knees of the adult female can be continuously in contact with the lid 12 in front of the passenger seat.

Although the above-described embodiment is an example of an embodiment of the disclosure, the disclosure is not limited to the above-described embodiment, and various modifications or alterations are possible without departing from the gist of the disclosure.

For example, in the above-described embodiment, the structure of the panel member according to the disclosure is applied to the lid 12 of the glove box 11 in front of the passenger seat 5 to restrain the occupant in the passenger seat 5 from moving forward from the passenger seat 5 in a front collision.

The automobile 1 includes the driver's seat 4 and rear seats in addition to the passenger seat 5. The panel structure according to the disclosure may be similarly applied to a panel member provided in front of these seats. The dashboard 7 is provided in front of the driver's seat 4. Rear panels of seats in front of the rear seats are provided in front of the rear seats. The structure of the panel member according to the disclosure may be applied to the dashboard 7 and the rear panels of the seats.

The driver is seated in the driver's seat 4. The driver operates an accelerator pedal (not illustrated), for example, with their foot. In this case, the dashboard 7 is to be structured such that the driver's foot that operates the accelerator pedal, for example, does not come into contact with the dashboard 7. Also, a backrest provided on a seat part of each seat may not be as rigid as the lid 12 of the glove box 11. In these cases, the structure of the panel member according to the disclosure cannot be easily applied to the dashboard 7 or the backrest of each seat. In addition, each rear seat has the backrest of a seat, such as the passenger seat 5, in front thereof. In this case, the occupant of the rear seat cannot move forward beyond the backrest of the passenger seat 5. Therefore, it is not necessary that the structure of the panel member according to the disclosure be applied to the backrest of the seat.

In contrast, the passenger seat 5 provided next to the driver's seat 4 in which the driver sits does not have the backrest of another seat in front thereof. Therefore, the structure of the panel member according to the disclosure may be applied to the lid 12 of the glove box 11 provided in the dashboard 7 in front of the passenger seat 5.

The invention claimed is:

1. A panel member provided in front of a seat in a vehicle cabin of a vehicle at a height such that knees of an occupant who moves forward from the seat are to come into contact with the panel member, the panel member comprising:
   a cover member defining a surface of the panel member; and
   a reinforcement member provided behind the cover member,
   wherein the reinforcement member comprises an upper part in an up-down direction of the vehicle and a lower part other than the upper part,
   wherein the upper part is provided with a first grid-shaped rib unit extending over an overall width of the reinforcement member in a vehicle width direction of the vehicle, and wherein the lower part is provided with a second grid-shaped rib unit in a region excluding a central part of the reinforcement member in the vehicle width direction of the vehicle, the central part including no rib and being thin-plate-shaped.

2. The panel member according to claim 1,
wherein the upper part of the reinforcement member is provided at a height such that knees of a first occupant of a predetermined size who moves forward from the seat are to come into contact with the upper part, and
wherein the lower part of the reinforcement member is provided at a height such that knees of a second occupant of a second predetermined size who moves forward from the seat are to come into contact with the lower part.

3. The panel member according to claim 2,
wherein, in the lower part of the reinforcement member, the central part in the vehicle width direction in which the second grid-shaped rib unit is not provided is to overlap a region to be contacted by one of right and left knees of an a second occupant of a second predetermined size who moves forward from the seat, the one of the right and left knees that is closer to a center of the vehicle in the vehicle width direction than another one of the right and left knees.

4. The panel member according to claim 3,
wherein the seat is a passenger seat,
wherein the panel member in front of the passenger seat is a lid of a glove box of the vehicle,
wherein the cover member of the lid of the glove box comprises an operation unit to be operated by the occupant of the vehicle to open and close the glove box, and
wherein the operation unit is provided at a height corresponding to the upper part of the reinforcement member.

5. The panel member according to claim 4,
wherein the reinforcement member is attached to a back surface of the cover member at an end of the first grid-shaped rib unit over a region of the upper part excluding an upper region of the central part in the vehicle width direction.

6. The panel member according to claim 1,
wherein, in the lower part of the reinforcement member, the central part in the vehicle width direction in which the second grid-shaped rib unit is not provided is to overlap a region to be contacted by one of right and left knees of a second occupant of a second predetermined size who moves forward from the seat, the one of the right and left knees being closer to a center of the vehicle in the vehicle width direction than another one of the right and left knees.

7. The panel member according to claim 6,
wherein the seat is a passenger seat,
wherein the panel member in front of the passenger seat is a lid of a glove box of the vehicle,
wherein the cover member of the lid of the glove box comprises an operation unit to be operated by the occupant of the vehicle to open and close the glove box, and
wherein the operation unit is provided at a height corresponding to the upper part of the reinforcement member.

8. The panel member according to claim 7,
wherein the reinforcement member is attached to a back surface of the cover member at an end of the first grid-shaped rib unit over a region of the upper part excluding an upper region of the central part in the vehicle width direction.

9. The vehicle comprising the panel member according to claim 1.

10. A panel member provided in a seat the panel member comprising:
a cover member defining a surface of the panel member; and
a reinforcement member provided behind the cover member,
wherein the reinforcement member comprises an upper part in an up-down direction of the vehicle and a lower part other than the upper part,
wherein the upper part is provided with a first grid-shaped rib unit extending over an overall width of the reinforcement member in a vehicle width direction of the vehicle, and
wherein the lower part is provided with a second grid-shaped rib unit in a region excluding a central part of the reinforcement member in the vehicle width direction of the vehicle, the central part including no rib and being thin-plate-shaped.

11. The panel member according to claim 10,
wherein the upper part of the reinforcement member is provided at a height such that knees of a first occupant who moves forward from the seat are to come into contact with the upper part, and
wherein the lower part of the reinforcement member is provided at a height such that knees of a second occupant smaller than the first occupant who moves forward from the seat are to come into contact with the lower part.

12. The panel member according to claim 10,
wherein, in the lower part of the reinforcement member, the central part in the vehicle width direction in which the second grid-shaped rib unit is not provided is to overlap a region to be contacted by one of right and left knees of a second occupant smaller than a first occupant who moves forward from the seat, the one of the right and left knees being closer to a center of the vehicle in the vehicle width direction than another one of the right and left knees.

13. The panel member according to claim 12,
wherein the seat is a passenger seat,
wherein the panel member in front of the passenger seat is a lid of a glove box of the vehicle,
wherein the cover member of the lid of the glove box comprises an operation unit to be operated by the occupant of the vehicle to open and close the glove box, and
wherein the operation unit is provided at a height corresponding to the upper part of the reinforcement member.

14. The panel member according to claim 13,
wherein the reinforcement member is attached to a back surface of the cover member at an end of the first grid-shaped rib unit over a region of the upper part excluding an upper region of the central part in the vehicle width direction.

15. The panel member according to claim 11,
wherein, in the lower part of the reinforcement member, the central part in the vehicle width direction in which the second grid-shaped rib unit is not provided is to overlap a region to be contacted by one of right and left knees of a second occupant smaller than a first occupant who moves forward from the seat, the one of the right and left knees that is closer to a center of the vehicle in the vehicle width direction than another one of the right and left knees.

16. The panel member according to claim 15,
wherein the seat is a passenger seat,
wherein the panel member in front of the passenger seat is a lid of a glove box of the vehicle,
wherein the cover member of the lid of the glove box comprises an operation unit to be operated by the occupant of the vehicle to open and close the glove box, and
wherein the operation unit is provided at a height corresponding to the upper part of the reinforcement member.

17. The panel member according to claim 16,
wherein the reinforcement member is attached to a back surface of the cover member at an end of the first grid-shaped rib unit over a region of the upper part excluding an upper region of the central part in the vehicle width direction.

18. The vehicle comprising the panel member according to claim 10.

19. A vehicle system, comprising:
a panel member provided in front of a seat in a vehicle cabin of a vehicle at a height such that knees of an occupant who moves forward from the seat are to come into contact with the panel member, the panel member comprising:
a cover member defining a surface of the panel member; and
a reinforcement member provided behind the cover member,
wherein the reinforcement member comprises an upper part in an up-down direction of the vehicle and a lower part other than the upper part,
wherein the upper part is provided with a first grid-shaped rib unit extending over an overall width of the reinforcement member in a vehicle width direction of the vehicle, and
wherein the lower part is provided with a second grid-shaped rib unit in a region excluding a central part of the reinforcement member in the vehicle width direction of the vehicle, the central part including no rib and being thin-plate-shaped.

20. The vehicle system according to claim 19,
wherein the upper part of the reinforcement member is provided at a height such that knees of an adult male who moves forward from the seat are to come into contact with the upper part, and
wherein the lower part of the reinforcement member is provided at a height such that knees of an adult female who moves forward from the seat are to come into contact with the lower part.

* * * * *